(No Model.)
J. N. KEY.
DRAG ROD.
No. 297,811. Patented Apr. 29, 1884.
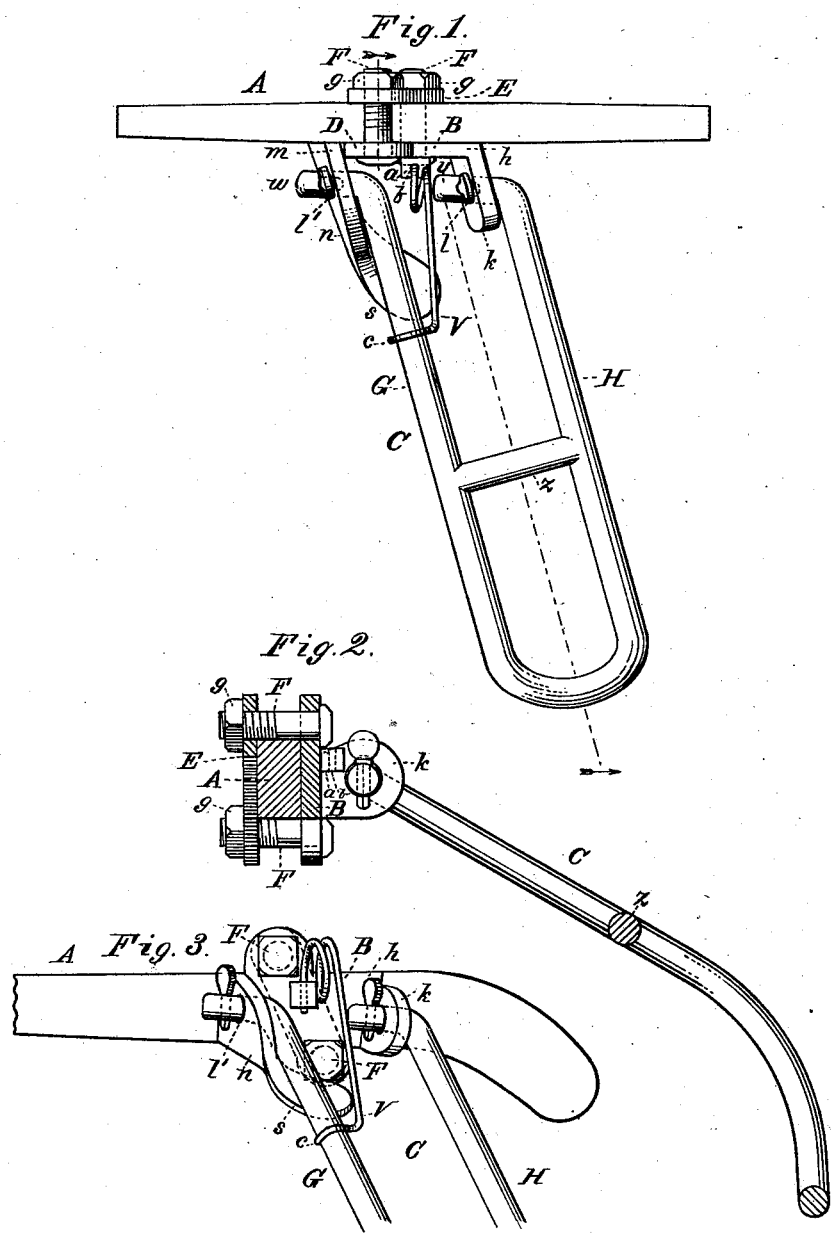
WITNESSES
Villette Anderson.
John T. Morrow
INVENTOR
John N. Key
by Anderson & Smith
his ATTORNEYS

UNITED STATES PATENT OFFICE.

JOHN N. KEY, OF PRINCETON, INDIANA.

DRAG-ROD.

SPECIFICATION forming part of Letters Patent No. 297,811, dated April 29, 1884.

Application filed February 4, 1884. (No model.)

*To all whom it may concern:*

Be it known that I, JOHN N. KEY, a citizen of the United States, residing at Princeton, in the county of Gibson and State of Indiana, have invented certain new and useful Improvements in Drag-Rods; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of the invention, and is a top view. Fig. 2 is a vertical section taken across the beam of the plow. Fig. 3 is a side view with the lower portion of the drag-rod broken off.

This invention has relation to "drag-rods" or devices for holding down weeds during the operation of a plow, so that the soil may be properly turned in forming the furrow; and the invention consists in the construction and novel arrangement of devices, as hereinafter set forth, and particularly pointed out in the appended claims.

In the accompanying drawings, the letter A designates the beam of a plow, to which the drag-rod C is connected by means of the hinge-clip B. The hinge-clip consists of the hinge-plate D, the clamp-plate E, and the bolts F, which are passed through perforations in the hinge-plate and clamp-plate above and below the beam, and are secured by nuts g. The hinge-plate is formed with a rear extension, h, from the end of which projects an oblique lug, k, directed laterally and somewhat backward, as shown, and having a perforation or bearing, l, in which the rear journal of the drag-rod is seated. The hinge-plate has also a forward extension, m, from which projects laterally and somewhat rearward an arm, n, the first part of which is parallel to the lug k, and is perforated to form a bearing, l', for the forward journal of the drag-rod. The terminal portion s of this arm is turned under, in bent or twisted form, to provide a support for the drag-rod, upon which said rod bears when not raised by the brush and weeds. By means of this support the drag-rod is held up from the ground in turning corners and in other movements.

The drag-rod consists of a piece of stout wire bent in loop form at its outer end, and having at the ends of the two arms the journals v and w, as shown. These journals are in line with each other, but oblique to their respective arms G and H, which are nearly upon the same level, the arm in rear being slightly lower than the arm in front, usually. The general direction of the drag-rod is lateral and somewhat rearward and downward, its terminal or loop-form end being bent downward below the plane of the arms, as shown, so that the drag-rod will be able to hold the weeds in pulling them down. The length of the drag-rod from the center of its loop-form end to where its journals enter the eyes of the hinge-plate is usually about two feet five inches in front and two feet three inches in rear, and the distance between the arms is usually about four and one-half inches. A cross-bar, z, or brace usually connects the arms G and H at about their middle portions, and serves a material purpose in strengthening the rod.

On the hinge-plate is cast a lug, a, which is provided with a perforation, b, adapted to receive the end of a spring, V, the terminal end of which is bent to form a bearing, c, to engage the forward arm of the drag-rod. This spring is designed to hold the drag-rod down with elastic pressure, facilitating its operation upon weeds, which, growing more luxuriantly in one place than in another, would not always be engaged by a more rigid device; and, furthermore, the spring provides the power whereby the drag-rod is held down in its operation, and enables said rod to yield when brought into engagement with a stump or obstruction of sufficient rigidity to injure or break it and destroy its usefulness.

It will be seen that each of the journals of the drag-rod is perforated at its end to receive a holding-key, a split pin being preferably employed.

Having described this invention, what I claim, and desire to secure by Letters Patent, is—

1. The combination, with the hinge-plate

B, constructed substantially as shown and described, having the forwardly-extending arms provided with perforations to receive the journal ends of the drag-rod, the arm n, bent inwardly and downwardly to form an under support for the said rod, the spring-arm V having its inner end secured to the said hinge-plate, and its outer end bent over and engaging the drag-rod, the drag-rod, and means for securing the hinge-plate to a plow-beam, substantially as specified.

2. The combination, with the loop-form drag-rod, of the hinge-plate having bearings receiving the journal ends of the rod, a supporting-arm extending under the rod, and a bearing-spring attached to the hinge-plate and engaging the rod, substantially as specified.

In testimony whereof I affix my signature in presence of two witnesses.

JOHN N. KEY.

Witnesses:
CHAS. O. ERWIN,
JOHN W. EWING.